US010308477B2

(12) United States Patent
Patel

(10) Patent No.: US 10,308,477 B2
(45) Date of Patent: Jun. 4, 2019

(54) SMART ELEVATOR MOVEMENT

(71) Applicant: ECHOSTAR TECHNOLOGIES L.L.C., Englewood, CO (US)

(72) Inventor: Bhavesh Patel, Woodstock, GA (US)

(73) Assignee: ECHOSTAR TECHNOLOGIES INTERNATIONAL CORPORATION, Englewood, CO (US)

( * ) Notice: Subject to any disclaimer, the term of this patent is extended or adjusted under 35 U.S.C. 154(b) by 183 days.

(21) Appl. No.: 15/332,617

(22) Filed: Oct. 24, 2016

(65) Prior Publication Data

US 2018/0111787 A1 Apr. 26, 2018

(51) Int. Cl.

*B66B 1/28* (2006.01)
*G05B 15/00* (2006.01)
*B66B 1/34* (2006.01)
*B66B 1/24* (2006.01)

(52) U.S. Cl.

CPC .......... *B66B 1/3476* (2013.01); *B66B 1/2458* (2013.01); *B66B 2201/215* (2013.01); *B66B 2201/222* (2013.01)

(58) Field of Classification Search

CPC ..... B66B 1/2408; B66B 1/468; B66B 5/0012; B66B 2201/103; B66B 2201/405; B66B 2201/4615; B66B 2201/215; B66B 2201/222; B66B 1/3476; B66B 1/2458; G05B 17/02
USPC .......................................................... 187/247
See application file for complete search history.

(56) References Cited

U.S. PATENT DOCUMENTS

| | | | | |
|---|---|---|---|---|
| 3,168,164 | A * | 2/1965 | Kiely | B66B 1/3476 187/392 |
| 4,555,724 | A * | 11/1985 | Enriquez | G06T 5/20 187/392 |
| 4,989,694 | A | 2/1991 | Ueshima et al. | |
| 5,258,586 | A * | 11/1993 | Suzuki | B66B 1/2458 187/380 |
| 5,490,580 | A * | 2/1996 | Powell | B66B 1/2408 187/281 |
| 5,808,247 | A | 9/1998 | Thangavelu | |
| 7,546,905 | B2 | 6/2009 | Nikovski et al. | |
| 2011/0174580 | A1* | 7/2011 | Tokura | B66B 1/2458 187/382 |
| 2012/0125719 | A1* | 5/2012 | Sundholm | B66B 1/2458 187/382 |
| 2016/0289042 | A1* | 10/2016 | Fang | G06T 7/10 |
| 2016/0289043 | A1* | 10/2016 | Fang | B66B 13/146 |
| 2016/0289044 | A1* | 10/2016 | Hsu | B66B 1/2408 |
| 2016/0291558 | A1* | 10/2016 | Finn | B66B 1/468 |

(Continued)

*Primary Examiner* — Jeffrey Donels
(74) *Attorney, Agent, or Firm* — Lorenz & Kopf LLP

(57) ABSTRACT

One or more elevators can be more efficiently controlled by considering the then-current spatial capacity of the elevator. Camera images or other sensor data indicative of the occupied space in the elevator are received and processed by a control device to determine whether or not the elevator should stop at a requested floor. If the elevator is determined to lack space for additional passengers, then the elevator can bypass the requested stop and proceed without delay. If space remains, however, the elevator can stop to accommodate additional passengers. Measured spatial capacity can also be used to coordinate the actions of multiple elevators operating within a building.

19 Claims, 4 Drawing Sheets

(56) References Cited

U.S. PATENT DOCUMENTS

2016/0292515 A1* 10/2016 Jia .............................. B66B 3/02
2016/0292521 A1* 10/2016 Fang ...................... B66B 1/2408
2016/0292522 A1* 10/2016 Chen ...................... B66B 1/3476
2016/0295192 A1* 10/2016 Hsu ........................ B66B 1/2408
2016/0297642 A1* 10/2016 Finn ....................... B66B 1/3476
2016/0340148 A1* 11/2016 Salmikuukka .......... B66B 1/468

* cited by examiner

SMART ELEVATOR MOVEMENT

TECHNICAL FIELD

The following discussion generally relates to control of elevators used to move people in buildings. More particularly, the following discussion relates to systems, devices and processes to control elevator movement based upon detected elevator occupancy.

BACKGROUND

Many multi-story buildings use elevators to transport people and objects between floors of the building. People who work in tall buildings, for example, often ride in elevators several times during each workday as they arrive at work, attend meetings on other floors, go to lunch, depart for the day and/or for many other reasons.

Modern elevators are often scheduled and controlled by computing machinery for efficient operation. Nevertheless, many inefficiencies continue to occur. During a typical trip to or from the upper floors of a tall building, for example, many (if not most) elevator occupants will experience delays as the elevator stops to pick up additional passengers. In many cases, the elevator will stop for additional passengers even if the elevator is already full, thereby unnecessarily wasting the current occupants' time.

Although some attempts have been made to detect elevator occupancy based upon weight, weight-based determinations can be misleading. If several passengers are lighter than average (e.g., a group of children), for example, the total weight of the elevator would indicate that capacity remains even though no space is available for additional passengers. Similarly, if a passenger has a relatively large amount of baggage or other bulk, the weight of the car will not provide an accurate estimation of the current capacity that is available. As a result, the elevator will make unnecessary stops for additional passengers even though there is no space to accommodate those passengers. These unnecessary stops can create aggravation amongst passengers on the elevator as they are delayed. Moreover, the unnecessary stops are an inefficient use of the elevator itself, thereby creating additional delays for all others who are waiting for the elevator on other floors.

It is therefore desirable to create systems, devices and processes for more efficient control of one or more elevators operating within a building. These and other features and characteristics will become apparent from the subsequent detailed description and the appended claims, taken in conjunction with the accompanying drawings and this background section.

BRIEF SUMMARY

One or more elevators can be more efficiently controlled by considering the then-current spatial capacity of the elevator. Camera images or other sensor data indicative of the occupied space in the elevator are received and processed by a control device to determine whether or not the elevator should stop at a requested floor. If the elevator is determined to lack space for additional passengers, then the control device directs the elevator to bypass the requested stop and to proceed without delay. If space remains, however, the elevator can be directed to stop so that additional passengers are accommodated. Measured spatial capacity can also be used to coordinate the actions of multiple elevators operating within a building, or for any other purpose.

Various embodiments relate to a process executable by a controller device that controls an elevator. The process suitably comprises receiving a request at the controller device to stop the elevator at a requested floor; receiving, by the controller device, sensor data from a sensor that is associated with elevator; processing the sensor data by the controller device to determine a current spatial occupancy of the elevator; and directing the elevator to bypass the requested floor if the current spatial occupancy exceeds a threshold amount, and otherwise directing the elevator to stop at the requested floor. The process may be augmented in some implementations to consider data from additional sensors located outside of the elevator to determine a spatial demand for the elevator. The elevator suitably bypasses the requested floor if the current spatial occupancy indicates that space remaining in the elevator is less than the spatial demand for the elevator.

Other embodiments provide a controller device for an elevator, the controller device comprising: a data interface configured to receive sensor data associated with the elevator; a memory configured to store instructions; and a controller configured to execute the instructions stored by the memory, wherein the instructions, when executed, cause the controller device to perform a process comprising: receiving a request at the controller device to stop the elevator at a requested floor; receiving, by the controller device, the sensor data from a sensor that is associated with elevator; processing the sensor data by the controller device to determine a current spatial occupancy of the elevator; and directing the elevator to bypass the requested floor if the current spatial occupancy exceeds a threshold amount, and otherwise directing the elevator to stop at the requested floor.

Other embodiments use determined spatial occupancy to coordinate the actions of multiple elevators, to improve efficiency in multi-elevator environments, and/or for any other purpose. These examples and several others are described in increasing detail below.

BRIEF DESCRIPTION OF THE DRAWING FIGURES

Example embodiments will hereinafter be described in conjunction with the following drawing figures, wherein like numerals denote like elements, and FIG. 1 is a diagram of an example elevator system operating within a building.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, elevator operation is improved through the use of spatial occupancy detection. By detecting how much of the elevator space is actually occupied, it can be readily deduced whether additional space is available for additional passengers or objects. To that end, various embodiments use optical, infrared and/or other sensors to measure the amount of area that is available, and to schedule additional stops based upon the available capacity. Further embodiments could also use optical or other sensors in the elevator waiting areas to estimate the requested elevator capacity. This estimate can then be compared to the current excess spatial capacity of the elevator, which can in turn be used to determine whether or not sufficient space is available in the elevator to accommodate additional passengers. Estimated space available and/or requested load space can be used to coordinate actions of multiple elevators cars, as desired. These concepts are described in greater detail below.

Figure 1:
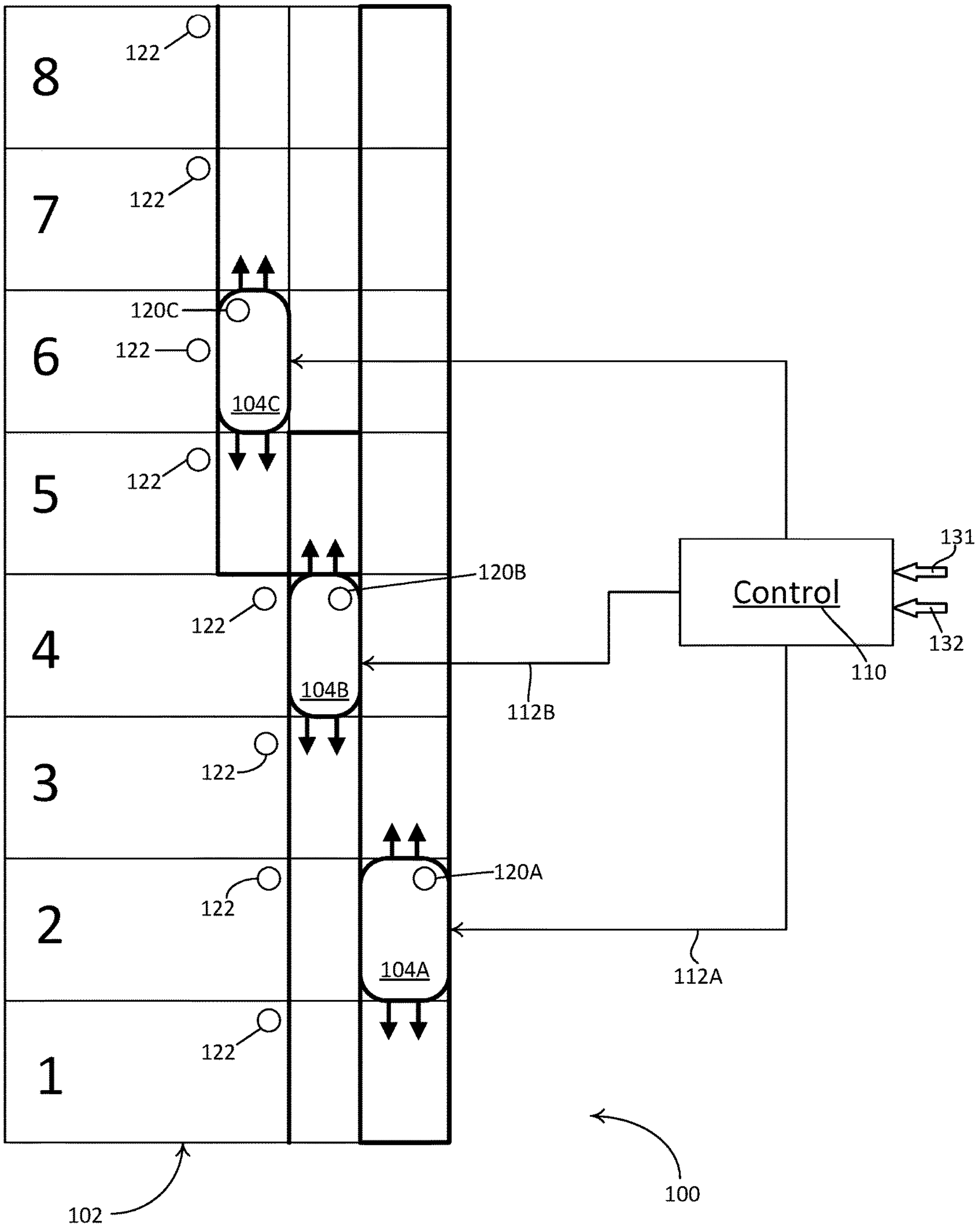

Turning now to the drawing figures and with initial reference to FIG. 1, spatial detection of elevator occupancy is performed by a control device 110 based upon data 131, 132 received from one or more sensors 120, 122. In the example of FIG. 1, an example elevator system 100 operating within a building 102 suitably includes a controller 110 that provides one or more control signals 112A-C to direct the movement, stops and/or other actions of one or more elevator cars 104A-C, respectively. Although the example illustrated in FIG. 1 shows three elevators 104A-C operating between eight floors, other embodiments could of course use any number of elevators (including a single elevator) operating between any number of different floors, including any number of above or below ground floors. In some implementations, all of the elevator cars 104 service the same floors of building 102; other embodiments could be implemented using one or more elevators that are limited to only subsets of floors. The example of FIG. 1, for example, shows elevator car 104A serving all floors of the building 102, whereas elevator car 104B services only the lower floors and elevator car 104C services only the upper floors. Passengers travelling from the ground floor to the top floor, then, could take elevator car 104A for a direct trip, or they could take elevator car 104B to the fifth floor and then transfer to car 104C for the remainder of the trip. Other embodiments could provide any number of elevators (including a single elevator) serving any number of floors according to any desired arrangement.

As discussed more fully below, each elevator car 104 contains one or more sensors 120 for detecting the amount of occupied (or unoccupied) space in the elevator. Sensors 120 may be, for example, cameras that are used to capture imagery of the elevator floor, walls and/or ceiling so that persons or other obstructing objects can be identified though image processing. Sensors 120 may be equivalently implemented using a grid of infrared, weight, pressure, temperature or other sensors that collectively detect the occupied area of the elevator car. Other techniques for measuring occupied space could be equivalently used, as set forth in additional detail below. Data 131 from sensors 120 is provided to controller 110 via any wireless, wired or other data transport mechanism for further processing.

Various embodiments could also include sensors 122 in the lobbies, foyers or other waiting areas for detecting (or at least estimating) the amount of space that is to be transported. Sensors 122 may also be cameras or other optical sensors, and/or any sort of grid or other collection of infrared, weight, temperature or other sensors. Data 132 collected from the various sensors 122 may be processed locally by the sensors 132 and/or delivered to controller no for further processing. Data 132 may be transmitted wirelessly in some embodiments, and/or data 132 may be delivered via a network, bus, cable or other physical transport as appropriate.

Controller 110 is a hardware device that is programmed using software, firmware and/or other programmable logic to control the operation of elevator cars 104A-B. In various embodiments, controller no is implemented within an embedded computer system, although other embodiments could implement controller 110 with conventional personal computers, servers or the like, as desired. Controller 110 may physically reside in or on an elevator car 104 in some embodiments, although controller no may be equivalently located elsewhere in building 102, such as in a data center or the like. Other embodiments could use the Internet or another network to deliver data 131, 132 and control signals 112 for offsite or other remote processing, as desired. Although FIG. 1 shows a single controller no that provides control signals 112A-C to multiple elevator cars 104A-C, other embodiments may divide the functionality of controller no between any number of processors, including processors located on one or more elevator cars 110A-C.

In operation, then, the controller no receives data 131 from elevator sensors 120 and uses the received data 131 to determine the then-current spatial capacity that remains in the elevator car 104. This information, in turn, can be used to decide whether or not the car 104 should respond to an elevator call. The STOP/NO_STOP determination can be provided to the car 104 as a data packet or other control signal 112 to the elevator's control hardware, as appropriate. Other embodiments may augment or modify this operation in any way. Controller no can make stoppage decisions based upon any combination of available space, needed space, numbers of requested stops and/or other factors as appropriate. Further embodiments could use spatial capacity data to coordinate the actions of two or more elevator cars in any manner. Several alternative embodiments are described below.

Figure 2:
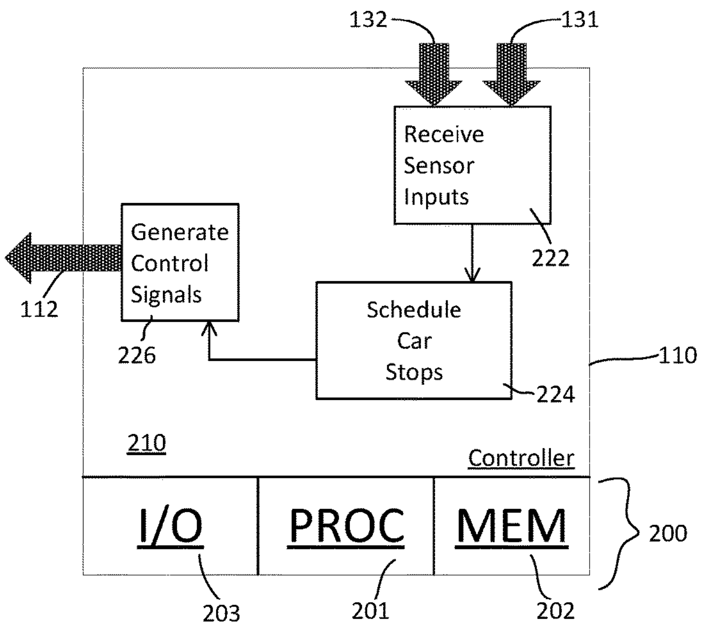
FIG. 2 is a block diagram of an example controller for an elevator system.

FIG. 2 shows a block diagram of an example controller 110 that includes processing hardware 200 including a processor 201, memory 202 and input/output interfaces 203 as appropriate. Processor 201 is any sort of microprocessor, microcontroller, digital signal processor or the like capable of executing program instructions to implement the various functions described herein. Program instructions and data may be stored in any sort of data storage 202, which may be implemented using any type of static, dynamic, flash or other memory, and/or with any sort of optical, magnetic or other data storage, as appropriate. Data storage 202 could be equivalently or alternately implemented with any sort of remote storage, such as any sort of file server or cloud storage that may be available. Interfaces 203 may include electrical and/or mechanical interfaces for transmitting and receiving data, or for otherwise communicating with other devices as desired. Example interfaces 203 could include any hardware for communicating with a bus, network and/or other wired or wireless data conduit as appropriate.

Controller device no is programmed or otherwise configured to execute software, firmware or other logic to provide a control system 210 for one or more elevator cars 104. In the example illustrated in FIG. 2, control system 210 includes hardware or software modules for processing sensor inputs (module 222), for scheduling elevator car operations (module 224) and for generating control signals 112 (module 226) as appropriate. In various embodiments, each module 222, 224, 226 represents software or firmware logic that can be stored (e.g., in memory 202) and executed by processor 201. Particular algorithms and processes executed by the various modules are set forth below, and other embodiments could equivalently provide additional or alternate modules executing other types of logic, as desired. Further, the example modules and hardware implementations described herein could be supplemented or modified in any way. Multiple processors could cooperate to provide the various functions described herein, for example, and/or the various functions described herein could be organized into different modules in any number of equivalent ways.

Inputs 131, 132 can be received from sensors 120, 122 (FIG. 1) in any manner. In various embodiments, module 222 or the like receives digital data transmitted wirelessly and/or via a wired connection via interfaces 203. The received data is formatted or otherwise processed for subsequent analysis. The particular formatting/processing that occurs varies depending upon the embodiment and the types of data collected by the various sensors 120, 122, and several examples are provided herein. Camera-type sensor 120, 122, for example, could provide digital imagery of any resolution that shows a then-current picture of the measured space. Equivalent embodiments could provide inputs from arrays of infrared, weight, heat or other sensors 120, 122, as desired. Note that captured data from sensors 120, 122 may be manipulated by the sensors themselves and/or any intervening hardware so that the data 131, 132 received by controller 110 is the result of image processing or other analysis of the raw data captured by sensors 120, 122. Alternatively, control device 110 could receive the raw data captured by the sensors, thereby reducing the computational power needed by the various sensor devices. Received data 131, 132 could be augmented with other factors (e.g., time of day, emergency status, etc.) as described herein.

Figure 3:
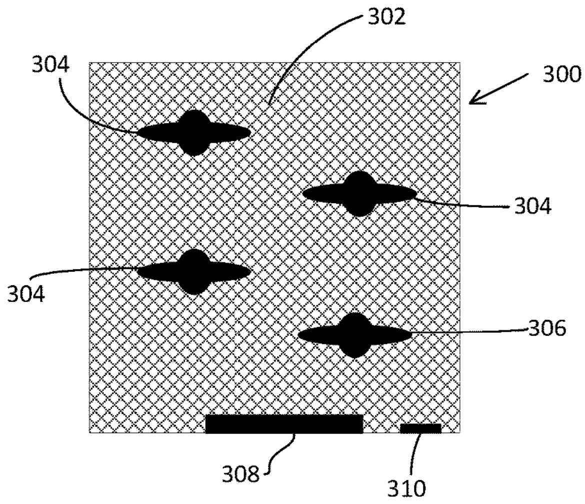
FIG. 3 illustrates an example technique for detecting elevator occupancy using optical recognition.

FIG. 3 shows on example image 300 of an elevator car 104 that could be received from a camera-type sensor 120, as desired. In this example, the background 302 of the image 300 is a known pattern corresponding to a floor, wall, ceiling or other portion of the elevator car 104. A camera 120 could be mounted to provide a top-down image 300, with the floor of the car 104 providing the background 302. This background 302 may be controlled (or at least known beforehand), for example by providing carpeting, tile, paint or another floor covering having an appropriate appearance.

As people, freight or other objects fill the elevator car, the top-down image 300 from camera 120 will indicate the relative area of the background that is obscured, thereby providing a highly accurate indication of the car's occupancy. If camera 120 can see only a small percentage of the car's floor, for example, then the car can be deduced to be relatively full. Conversely, if the camera can see most or all of the car's floor, then the car can be deduced to have available capacity for additional passengers or objects.

Detection of objects can be performed according to any appropriate algorithm or process. In various embodiments, image recognition is performed by controller 110 as part of module 222 and/or module 224. Other embodiments could process the imagery locally using a processor associated with camera 120 and/or elevator car 104. Any image processing techniques could be used. In one example, some or all of the pixels in the image are compared to known values to detect and count those pixels that deviate from the background value. "Values" could refer to pixel intensity, luminosity, color or any other value. By counting the number of pixels that do not correspond to the expected background 302, the relative percentage of the car's occupancy can be computed. Other embodiments may aggregate pixel values into one average, total or other combined value that can be compared to an empirically-determined threshold, without regard to the individual pixel values. That is, some implementations may not care about the specific pixels of the background that is obscured as much as the total area that is obscured. If a background 302 were configured to be entirely the maximum brightness, for example, the sum of the pixel intensities would be reduced for each pixel that obscures the background. Tracking the sum (or average) of the intensities, then, may be easier than tracking the values for each of the various pixels. Similar embodiments could track average or total variation from a known background color. Other embodiments could use statistical or other sampling techniques to evaluate only a subset of the pixels, and/or any number of other image processing techniques could be equivalently used to determine the occupied area of the elevator car 104.

Figure 4:
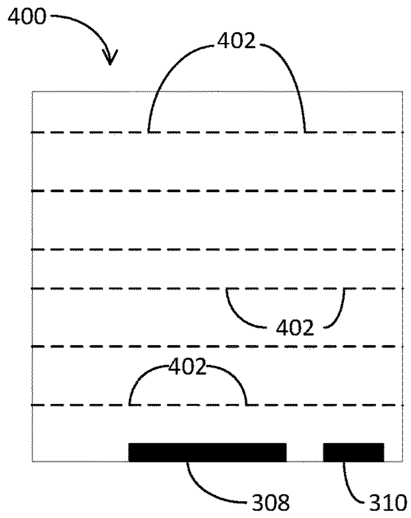
FIG. 4 illustrates an example technique for detecting elevator occupancy using grid sensors.

Alternative embodiments could use grids, points or other arrays of sensors 120, as desired. FIG. 4, for example, shows an array 400 of sensor 402 that could be used to sense the occupied area of the elevator car 104. In various embodiments, sensors 402 could each be weight or other actuation sensors that detect the presence of downward force in a particular area. Rather than detecting the total weight of the car's load, however, these weight sensors collectively detect the occupied area/volume of the car by detecting where objects are located. Once again, it may not be necessary to know the specific locations of the objects if the aggregate amount of available space can be known. To that end, it may be useful in some embodiments to simply track the total number of sensors 402 in grid 400 that are actuated, rather than focusing on the specific sensors 402 or the total weight detected.

In still other embodiments, the occupied area of the elevator car 104 can be detected using other types of sensors 402 arranged in a grid or other array 400. An array 400 of infrared, laser and/or other radio frequency (RF) sensors, for example, could optically detect what percentage of the array 400 is occupied by detecting breaks in continuity, or the like. Similarly, temperature or other sensors could detect which portions of array 400 are occupied, as desired.

The concepts illustrated in FIGS. 3 and 4 could be equivalently applied to lobbies, foyers or other areas where passengers are waiting for an elevator to arrive. If the currently-occupied area of a car 104 is known, this can be compared to the space that would be occupied by waiting passengers to determine whether or not the car should stop for the waiting passengers. If the car 104 lacks capacity for the waiting load, then the car 104 can save time by avoiding the stop entirely. Further, the controller 110 could use this information to dispatch other cars 104, to coordinate the actions of multiple cars 104 and/or for any other purpose.

Figure 5:
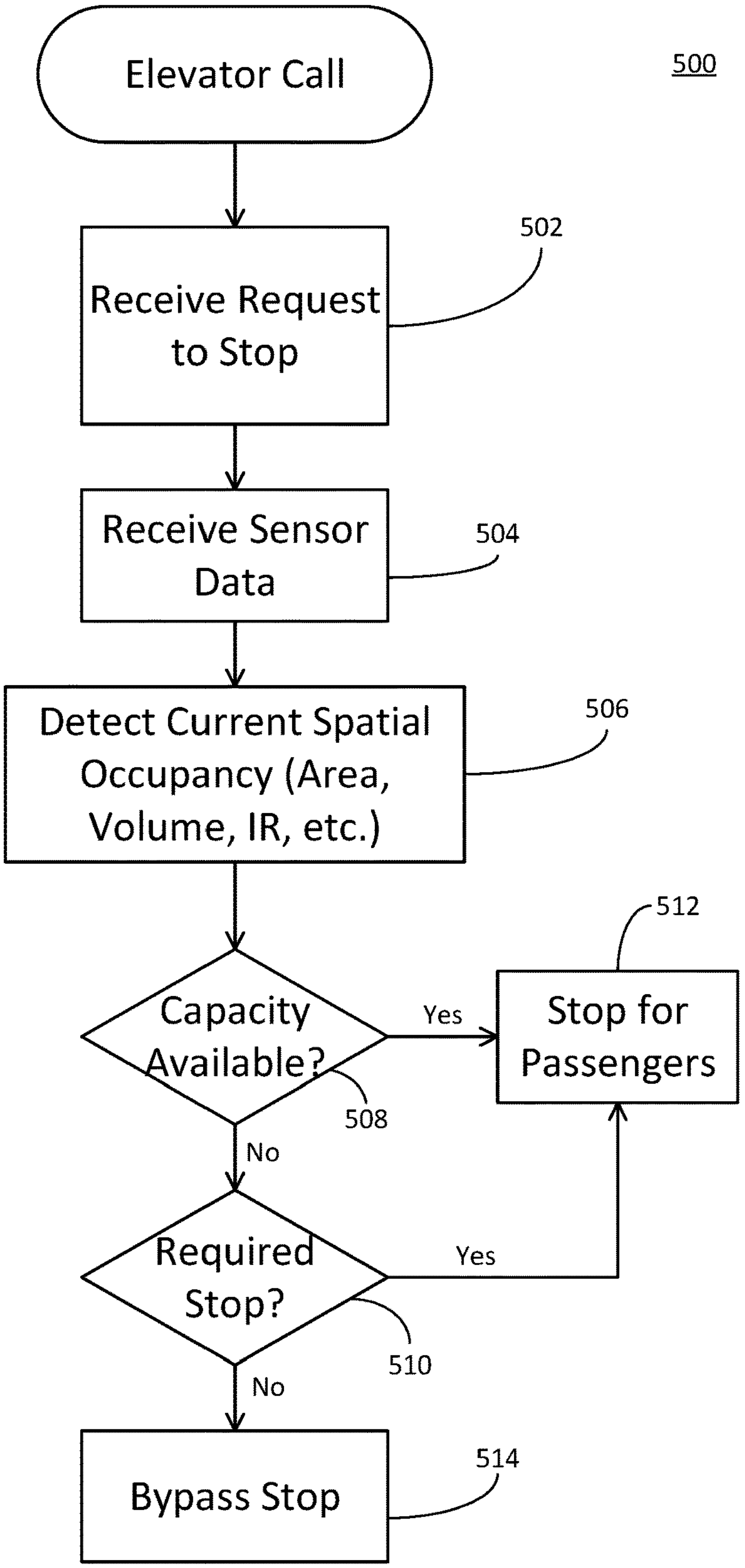
FIG. 5 is a flowchart illustrating an example technique for controlling an elevator based upon capacity detection.

FIG. 5 shows a flowchart of an example process 500 executed by controller 110 or the like (e.g., as part of control system 210) to process an elevator call. As illustrated in FIG. 5, process 500 suitably includes the broad functions of receiving a request to stop the elevator 104 (function 502), receiving sensor data 131 and/or 132 (function 504), detecting the current spatial area of the car 104 that is occupied (function 506), determining if excess capacity is available (function 504) and, if so, stopping for additional passengers (function 512). If no capacity is available, then the car 104 bypasses the stop (function 514) and continues so that current passengers are not unnecessarily delayed. Other embodiments may supplement or modify the process 500 for additional considerations (function 510) as desired.

Generally speaking, process 500 would be executed by controller 110 or the like to determine whether or not the elevator car 104 should stop at a requested floor. The request to stop at a particular floor may be received in any manner (function 502). Various embodiments could respond to a button press by a potential passenger, for example, whereas other embodiments could initiate process 500 in response to calls made by other cars 104 or other elements of system 100.

As noted above, the then-current spatial occupancy (e.g., how much space is occupied) can be very helpful in deciding whether or not the elevator should respond to a particular request to stop. If the elevator 104 is already full, then it would be a waste of time to stop for additional passengers. To that end, cameras or other sensors 120 provide sensor data 131 that is received by the controller 110 (function 504). Data 131 may be received in any manner (e.g., via any sort of wired or wireless data connection, network, bus or the like), and in any format. As noted previously, some embodiments may perform image processing or other pre-processing by the sensor 120, 122 or another device within system 100 so that the data 131, 132 received by the controller is already partially processed, as desired.

The current occupancy of elevator car 104 may be detected in any manner (function 506). As noted above, spatial occupancy may be measured through processing of pixels or other imagery obtained from a camera, through processing of grid or other array sensor data, and/or in any other manner. As noted above, camera imagery may processed to count the number of people present in the elevator 104 (e.g., for compliance with fire or occupancy codes) and/or to simply determine the area of the elevator car that is occupied by recognizing deviations in pixel values. Spatial occupancy may also consider baggage, boxes, packages or other objects that are present in the elevator, since these objects can occupy substantial areas of the elevator, thereby precluding additional occupants. As noted above, spatial occupancy can often provide a more realistic measure of elevator capacity than weight, especially when the elevator is transporting people or objects that are relatively large, yet not heavy.

Available capacity in the elevator may be determined in any manner (function 508). The occupancy values based upon sensor data may be compared to previously-determined threshold values, for example, using simple numerical comparisons. If only half of the pixels in an image contain known background imagery, for example, then it can be known that half of the elevator's area is occupied by people or objects. Again, it may not be necessary to know which portions of the elevator 104 are occupied if it is known what percentage or how much of the elevator area remains available. In the example of FIG. 5, function 508 identifies whether the elevator car 104 is full or not. "Full" in this sense simply refers to the lack of excess space to accommodate additional passengers or objects. If more than a threshold amount (e.g., 75% or so) of the car's floor space is obscured, for example, then some embodiments may conclude that the car is "full" even though some excess space is present. "Full" in this context, then, does not require 100% of the elevator's capacity; the particular threshold amount indicting "fullness" can vary from embodiment to embodiment depending upon desired comfort space, elevator utilization, and any other factors as desired. Further embodiments may allow elevator operators to configure the "fullness" parameter to their individual tastes, and/or "fullness" may be adapted during the course of the day (e.g., so that a "full" elevator provides additional comfort space during periods of reduced demand). The particular threshold values may be determined according to any technique, including trial and error, and may vary widely from implementation to implementation. Other embodiments may be adapted as desired.

If the car is full, then there is typically no need to stop for additional passengers (function 514). If space remains, then the car can stop to accommodate the additional passengers who are waiting (function 512). In either case, controller no directs the elevator car 104 to stop or continue by generating and providing control signals 112 or the like to the elevator motors or other controls, as described herein. Control signals 112 may be simple electrical signals in some implementations, or may be more complex data packets formatted in any manner for distribution via a bus, network or other data transmission as desired.

Note that the general parameters and routines described herein may be modified or overridden as needed. If a current passenger on the elevator car wishes to stop at a floor that would otherwise be bypassed, for example, then a "required stop" (function 510) can nevertheless be scheduled at that floor. Required stops 510 could also occur during fires or other emergencies when safety would dictate that passengers should disembark at the earliest opportunity. If system 100 detects that passengers are present in the elevator car 104 when an emergency alarm triggers, for example, function 510 or the like could stop the car 104 at the next safe floor to drop passengers off, as desired. Alternatively, stopping could be overridden to prevent passengers from entering the elevator car 104 during unsafe conditions or the like.

Controller no may consider additional factors as appropriate in scheduling stops (functions 508, 510). Controller no may consider the time of day, for example, in allocating space and/or in prioritizing stops. An elevator system 100 may prioritize upward passenger delivery during morning hours (as passengers arrive at work) over downward delivery. Prioritization could be reversed during afternoon/evening hours to accommodate departing passengers, as desired. Other embodiments could consider seasonal variations (e.g., holiday crowds at retail stores), holidays (e.g., to accommodate increased shopper traffic and/or reduced employee traffic on weekends or holidays), weather or traffic conditions and/or other factors, as appropriate.

Note that process 500 could be supplemented, as desired, to coordinate the actions of multiple elevator cars 104A-C. If one car 104A is full, for example, then another car 104B can be dispatched to handle the waiting passengers while car 104A proceeds directly to let off one or more passengers before making extra stops. Similarly, an "upper level" car 104C could be delayed until a "lower level" car 104B arrives, if desired. Further, the "lower level" car 104B could be directed to skip stops (even if capacity exists for additional passengers) if it allows the car 104B to arrive before car 104C departs, thereby allowing passengers in car 104B to catch the other car 104C without inordinately delaying the other car 104C. The ability to forego stops when the elevator is spatially full can substantially improve the efficiency of operating one elevator or any number of elevators, as appropriate.

Figure 6:
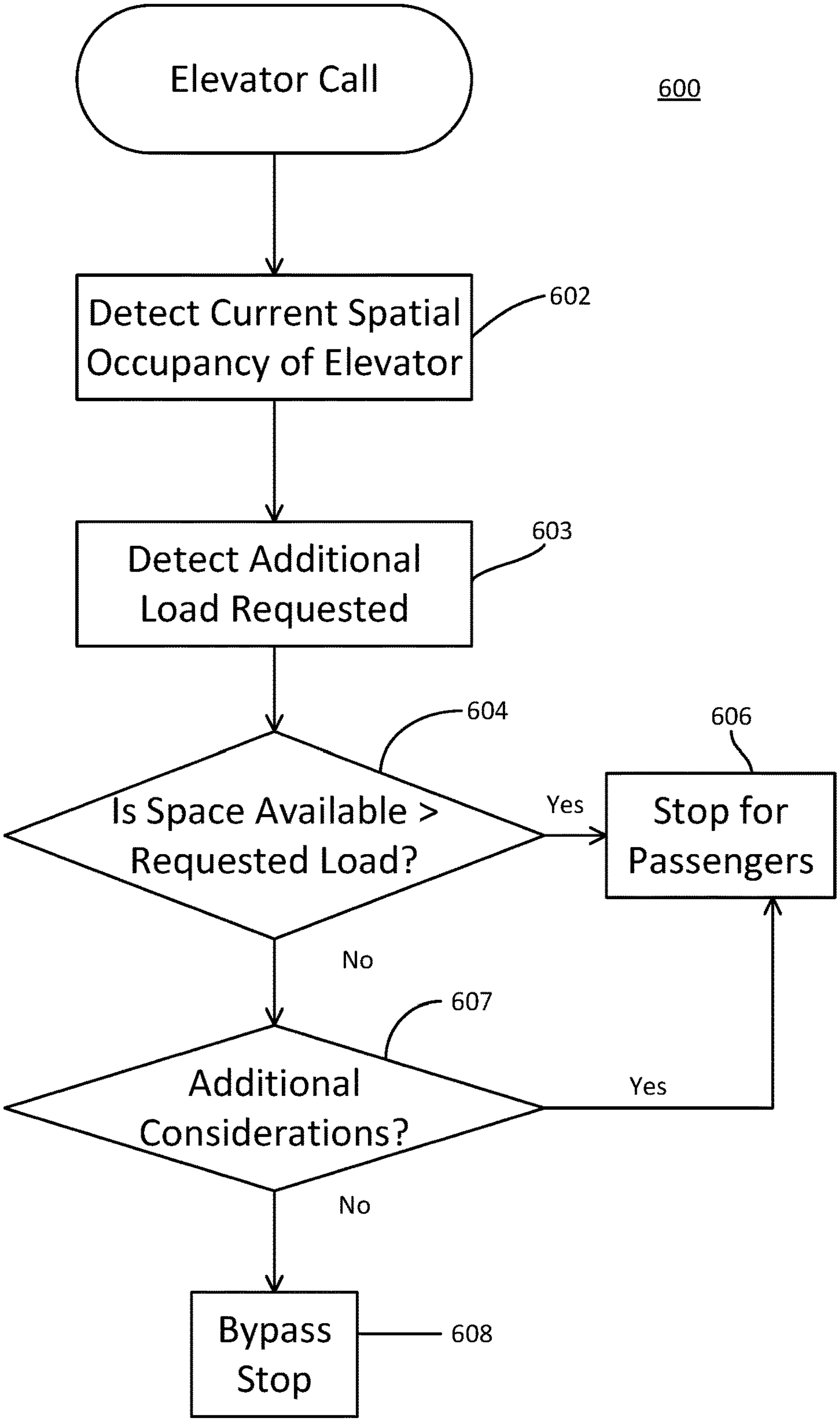
FIG. 6 is a flowchart illustrating an example technique for controlling an elevator based upon current capacity and requested load detection.

FIG. 6 shows a further process 600 that could be executed by controller 110 (e.g., as part of module 224) as desired. In this example, the controller no also receives data 132 from sensors 122 in one or more waiting areas so that the current spatial occupation of the elevator car 104 can be compared to the expected spatial load of the waiting passengers.

To that end, controller 110 suitably detects the current capacity of the car (function 602) in a manner similar to that described with functions 502-506 above (e.g., based upon data from camera or array sensors as desired). Additionally, controller 110 receives additional data 132 from sensors 122 (function 603) to detect the expected area (or volume) to be consumed by waiting passengers. If the expected space is greater than the available space in the car 104 (function 604), then the car 104 can be directed to stop for the waiting passengers. If the car 104 does not expect to have enough space for the waiting passengers, then the stop can be bypassed (function 608) for at least the time being. FIG. 6 therefore shows one process 600 that can consider both measured spatial occupancy and measured spatial demand to determine whether the elevator car 104 should stop, or whether the stop would simply serve to delay the current passengers in the car 104 without aiding the passengers who are waiting.

The general concepts set forth in the drawing figures may be supplemented or modified in any number of ways. Function 607, for example, indicates that the decision to stop or bypass waiting passengers may be augmented with other constraints or factors, as desired. If passengers have been waiting for a considerable time (e.g., on the order of several minutes), for example, then the car 104 may be encouraged to stop, even if insufficient capacity is available. This might encourage current passengers to move together more tightly to accommodate the waiting passengers, or it may allow a few of the waiting passengers to proceed even if the entire party is not able to ride on the same elevator 104. This recognizes that passenger groups may be willing to split up, especially when they have been waiting for an amount of time. Additional factors such as emergency conditions, time of day, seasonal factors and/or the like could be additionally or alternately considered, as appropriate. Several of these considerations were mentioned in connection with function 510 above.

As noted above, further embodiments could also consider the actions of other elevator cars 104 in deciding whether or not to stop for additional passengers. If a car 104 knows that another car is relatively empty (or at least has excess capacity), then the first car may skip one or more stops even though capacity for the additional passengers may be available. This would expedite the trip for the current passengers without unduly delaying the waiting passengers.

Further, if the elevator 104 knows that an event is about to occur, then the elevator may make extra effort to arrive prior to the event, even if excess capacity is available. If a top floor meeting, tour or other event is beginning shortly, for example, the car 104 may not stop at intervening floors to ensure that current passengers are not late for the event. Other events that could be scheduled include other elevators departing for higher (or lower) floors in a multi-stage elevator system, or any other events as desired. As noted above, if an elevator 104C for the upper floors of a building 102 is scheduled to depart soon, then system 100 may reduce the number of stops made by elevators 104B ascending from lower floors so that passengers on arriving elevator 104B can connect to departing elevator 104B without additional delay. (Of course similar constructs could also be used with descending elevators, particular during times of day that more people are leaving the building 102 than entering it.) Conversely, if the connecting elevator is not scheduled to depart for some time, then additional stops can be scheduled, as desired. In still other embodiments, controller 110 can pause or hold the departing elevator until other elevators arrive, as desired.

Further embodiments could adapt decisions to hold or release the elevator based upon the measured spatial capacity of the departing elevator, as well as the then-current occupancy of the arriving elevator. If a departing elevator is full, for example, then there is no need for it to wait until additional passengers arrive. Conversely, if a connecting elevator has enough space remaining to receive additional passengers, then it may be most efficient to hold the departing elevator until additional passengers arrive. The measured spatial capacity of the elevator can be used in any number of additional or alternate ways to efficiently schedule and operate any number of elevators, as desired.

It will therefore be appreciated that spatial evaluation of elevator occupancy has several marked advantages over weight-based monitoring. If no space is available in the elevator, then there is no need for the elevator to stop for additional passengers until the current spatial utilization is reduced. Although the spatial occupancy is largely discussed herein in terms of humans occupying the car, in practice equivalent concepts could be applied to freight, baggage or other packages, hospital or industrial equipment, factory equipment or inventory, and/or any other objects as desired.

The various processes, devices and systems described herein may be readily adapted for any number of equivalent environments and applications. The term "exemplary" is used herein to represent one example, instance or illustration that may have any number of equivalent alternatives. Any implementation described herein as "exemplary" is not necessarily to be construed as preferred or advantageous over other implementations, but rather as a mere example. While several example embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A process executable by a controller device that controls an elevator, the process comprising:
   - receiving a request at the controller device to stop the elevator at a requested floor;
   - receiving, by the controller device, sensor data from a sensor that is associated with elevator;
   - processing the sensor data by the controller device to determine a current spatial occupancy of the elevator; and
   - directing the elevator to bypass the requested floor if the current spatial occupancy exceeds a threshold amount to prevent a delay in arriving at a destination floor of the elevator, and otherwise directing the elevator to stop at the requested floor.

2. The process of claim 1 wherein the sensor is a camera, wherein the sensor data comprises a digital image of the elevator, and wherein the processing of the sensor data comprises processing the digital image of the elevator to determine the current spatial occupancy as an amount of elevator area that is occupied.

3. The process of claim 2 wherein the processing of the digital image of the elevator comprises counting a number of pixel values that differ from a predetermined value.

4. The process of claim 3 wherein the processing of the digital image of the elevator comprises determining if a sum of the pixel values varies from a predetermined value.

5. The process of claim 3 wherein the processing of the digital image of the elevator comprises determining if an average of the pixel values varies from a predetermined value.

6. The process of claim 1 wherein the directing comprises the controller device generating control signals to thereby control the movement of the elevator.

7. The process of claim 1 further comprising:

receiving additional data by the controller device from a second sensor located outside of the elevator on the requested floor;

processing the additional data by the controller device to determine a spatial demand for the elevator; and directing the elevator to bypass the requested floor if the current spatial occupancy indicates that space remaining in the elevator is less than the spatial demand for the elevator, and otherwise directing the elevator to stop at the requested floor.

8. The process of claim 1 further comprising directing the actions of another elevator based upon the spatial occupancy of the elevator.

9. The process of claim 1 wherein the elevator is directed to bypass the requested floor to allow passengers of the elevator to arrive at the destination floor in time to reach another elevator that is departing from the destination floor.

10. The process of claim 1 wherein the elevator is directed to bypass the requested floor to allow passengers of the elevator to arrive at the destination floor in time to reach another elevator that is departing from the destination floor if the spatial occupancy of the elevator is less than a current spatial capacity of the other elevator.

11. The process of claim 1 further comprising:

receiving other sensor data from another sensor located in another elevator that is departing from a destination floor: and processing the other sensor data by the controller device to determine the current spatial capacity of the other elevator; and wherein the directing comprises directing the elevator to bypass the requested floor to allow passengers of the elevator to arrive at the destination floor in time to reach the other elevator if the current spatial occupancy of the elevator is less than a current spatial capacity of the other elevator.

12. The process of claim 11 wherein the sensor and the other sensor are cameras, wherein the sensor data and the other sensor data comprise digital images of the elevator and the other elevator, respectively, and wherein the digital images are processed by the controller device to determine the current spatial occupancy of the elevator and the current spatial capacity of the other elevator.

13. A controller device for an elevator, the controller device comprising:

a data interface configured to receive sensor data associated with the elevator;

a memory configured to store instructions; and a controller configured to execute the instructions stored by the memory, wherein the instructions, when executed, cause the controller device to perform a process comprising:

receiving a request at the controller device to stop the elevator at a requested floor;

receiving, by the controller device, the sensor data from a sensor that is associated with elevator;

processing the sensor data by the controller device to determine a current spatial occupancy of the elevator; and directing the elevator to bypass the requested floor if the current spatial occupancy exceeds a threshold amount to prevent a delay in arriving at a destination floor of the elevator, and otherwise directing the elevator to stop at the requested floor.

14. The controller device of claim 13 wherein the sensor is a camera, wherein the sensor data comprises a digital image of the elevator, and wherein the processing of the sensor data comprises processing the digital image of the elevator to determine the current spatial occupancy as an amount of elevator area that is occupied.

15. The controller device of claim 13 wherein the processing of the digital image of the elevator comprises counting a number of pixel values that differ from a predetermined value.

16. The controller device of claim 13 wherein the process further comprises:

receiving additional data by the controller device from a second sensor located outside of the elevator on the requested floor;

processing the additional data by the controller device to determine a spatial demand for the elevator; and directing the elevator to bypass the requested floor if the current spatial occupancy indicates that space remaining in the elevator is less than the spatial demand for the elevator, and otherwise directing the elevator to stop at the requested floor.

17. The controller device of claim 13 wherein the elevator is directed to bypass the requested floor to allow passengers of the elevator to arrive at a destination floor in time to reach another elevator that is departing from the destination floor if the spatial occupancy of the elevator is less than a current spatial capacity of the other elevator.

18. The controller device of claim 13 wherein the process comprises:

receiving other sensor data from another sensor located in another elevator that is departing from a destination floor: and processing the other sensor data by the controller device to determine the current spatial capacity of the other elevator; and wherein the directing comprises directing the elevator to bypass the requested floor to allow passengers of the elevator to arrive at the destination floor in time to reach the other elevator if the current spatial occupancy of the elevator is less than a current spatial capacity of the other elevator.

19. The controller device of claim 18 wherein the sensor and the other sensor are cameras, wherein the sensor data and the other sensor data comprise digital images of the elevator and the other elevator, respectively, and wherein the digital images are processed by the controller device to determine the current spatial occupancy of the elevator and the current spatial capacity of the other elevator.

* * * * *